May 29, 1934. C. E. FACKINER 1,960,668
ILLUMINATED AUTOMOBILE SIGN
Original Filed July 12, 1933  3 Sheets-Sheet 1
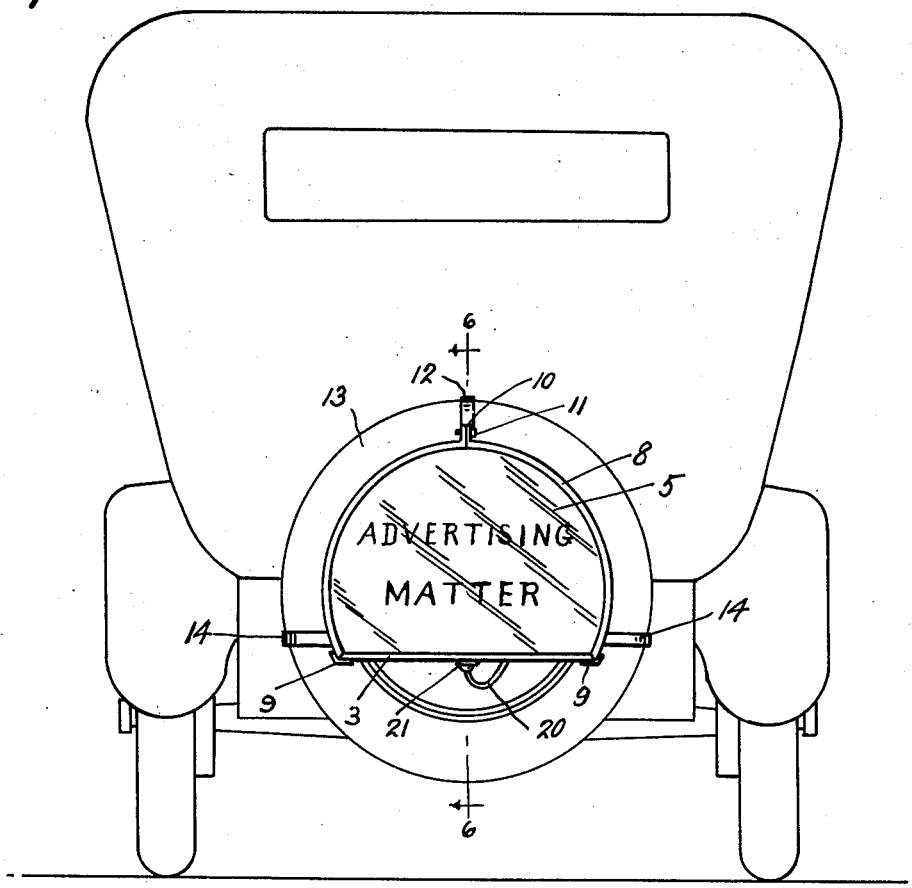
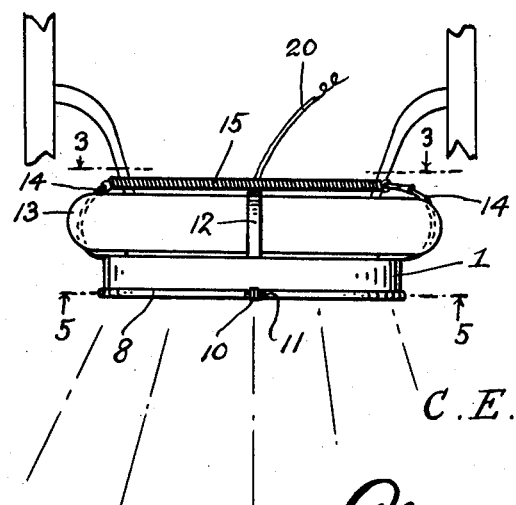
Inventor
C. E. Fackiner
By Clarence A O'Brien
Attorney May 29, 1934.        C. E. FACKINER        1,960,668
ILLUMINATED AUTOMOBILE SIGN
Original Filed July 12, 1933        3 Sheets-Sheet 2
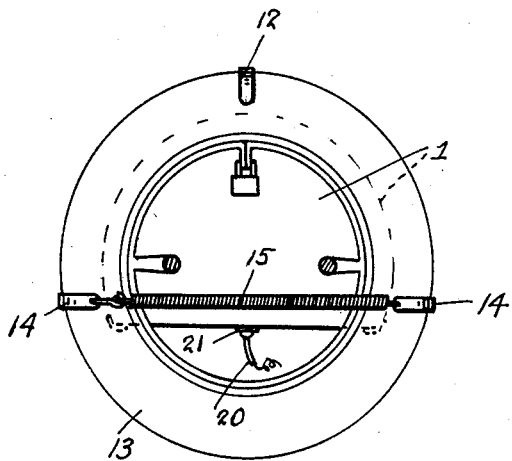
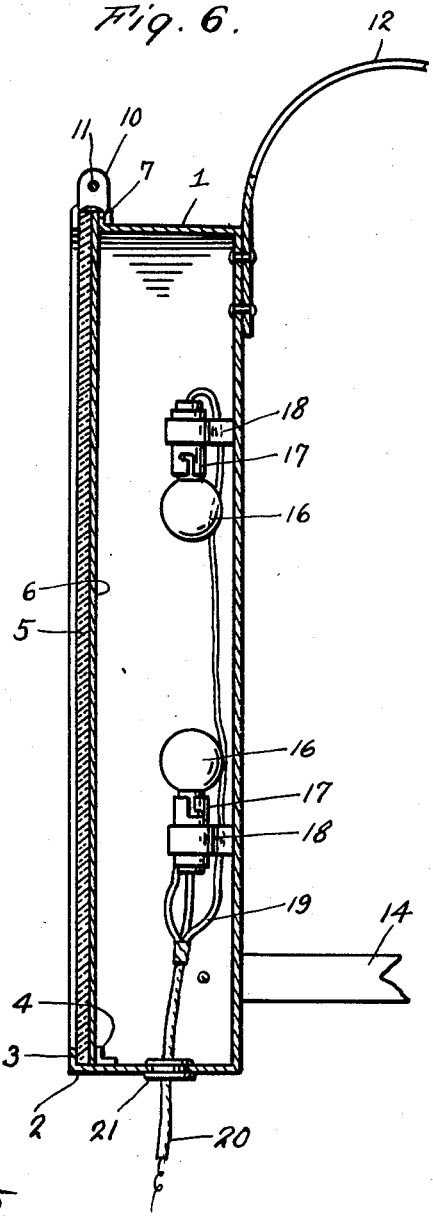
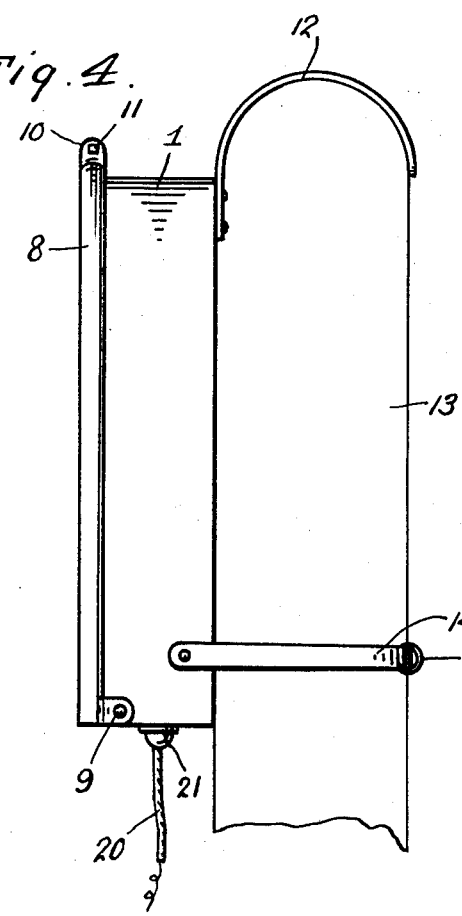
Inventor
C. E. Fackiner
By Clarence A. O'Brien
Attorney May 29, 1934.  C. E. FACKINER  1,960,668
ILLUMINATED AUTOMOBILE SIGN
Original Filed July 12, 1933  3 Sheets-Sheet 3
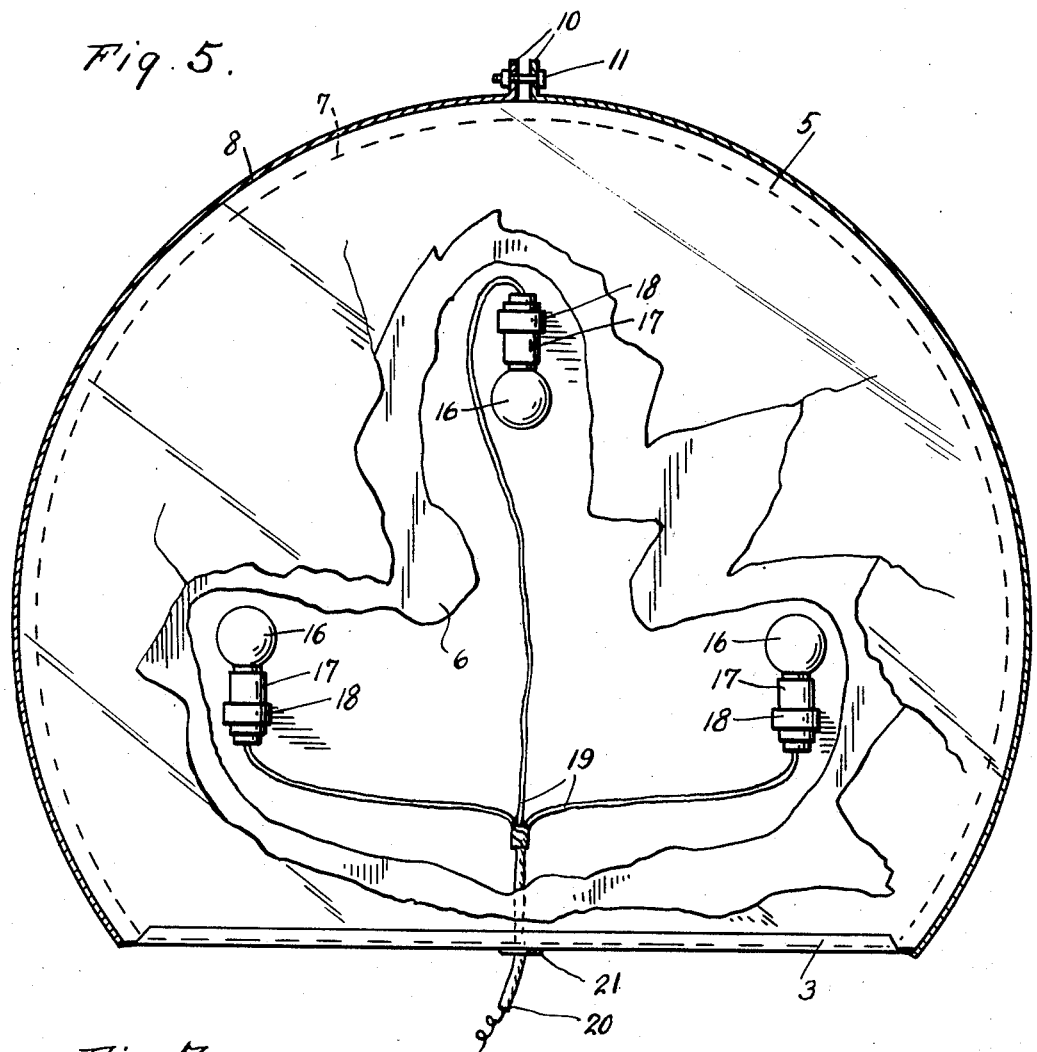
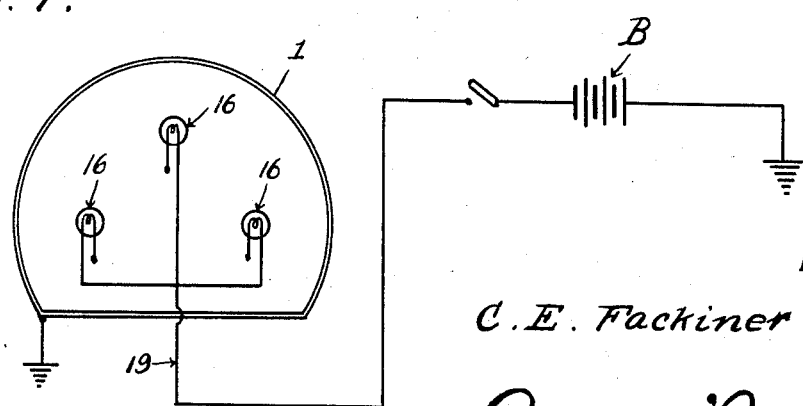
Inventor
C. E. Fackiner
By Clarence A. O'Brien
Attorney Patented May 29, 1934

1,960,668

UNITED STATES PATENT OFFICE 1,960,668

ILLUMINATED AUTOMOBILE SIGN

Carl Edwin Fackiner, Punxsutawney, Pa.

Application July 12, 1933, Serial No. 680,131
Renewed April 23, 1934

3 Claims. (Cl. 40—129)

This invention relates to an automobile sign, the general object of the invention being to provide a casing with means for attaching the casing to a part of the automobile and provided with means for illuminating a sign placed in an opening formed in the casing.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a rear view of an automobile showing the invention attached to the spare tire thereof.

Figure 2 is a top plan view of the spare tire, with the invention thereon and showing parts of an automobile.

Figure 3 is a section on line 3—3 of Figure 2.

Figure 4 is an edge view of the invention attached to the spare tire.

Figure 5 is a section on line 5—5 of Figure 2.

Figure 6 is a section on line 6—6 of Figure 1.

Figure 7 is a diagrammatic view of the circuits.

In these drawings, the numeral 1 indicates a casing, the front of which is open and the bottom part of which is extended, as shown at 2, with an upstanding flange 3 at the outer edge of said extension. An angle strip 4 is placed on the bottom of the casing and is spaced from the flange 3 so as to form a channel for receiving the transparent member 5 and the sign card 6, as more particularly shown in Figure 6. A flange 7 extends outwardly from the sides and top part of the casing and surrounds the opening and portions of the card 6 rest against this flange. A pair of substantially channel-shaped members 8 each has its lower end fastened to an end part of the bottom portion of the casing, as shown at 9, and the two members extend upwardly over the edges of the card and the transparent member and over the flange 7 and have their upper ends bent at an angle to form the perforated ears 10 through which a bolt 11 passes so as to hold the two members 8 in position to support the card and transparent member over the opening in the casing. The lower edges of the card and transparent member are supported between the flange 3 and the member 4.

Thus by loosening the bolt 11, the two members 8 can be separated so that a card can be removed and a new one substituted for it.

A substantially U-shaped member 12 is fastened to the top part of the rear portion of the casing and extends over a part of the spare tire 13 and a pair of similar members 14 are connected to the side parts of the casing and extend partly around the tire. These two members 14 are connected together by a spring 15, as shown in Figures 2 and 3.

A number of small bulbs 16 are located in the sockets 17 connected to the inner face of the closed side of the casing by the brackets 18 and conductors 19 connect these bulbs with a suitable source of current, such as the battery B of the automobile, as shown in Figure 7. The conductors pass through a flexible cable 20 which passes through an opening 21 in the bottom of the casing.

As shown in the drawings, I prefer to make the casing of somewhat more than a semi-circle, with its bottom part flat and to connect the casing to the spare tire by the members 12 and 14 and the spring 15, so that the casing can be readily removed from the spare tire when the same is to be used. It is to be understood, however, that the casing can be made of different shapes and can be supported on other parts of an automobile or other vehicle. It is to be also understood that the sign can be painted on the glass.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. An automobile sign of the class described comprising a casing having an opening in one face thereof, the bottom of the casing being flat and having an extension formed with an upwardly extending flange at its outer edge, a sign carrying member having its lower edge resting on the flat bottom, with its outer face abutting the flange, a strip extending across the bottom and forming a space between itself and the flange for said lower edge of the sign carrying member, an outwardly extending flange on the rest of the casing and surrounding the opening, and against which the sign carrying member abuts, a pair of channel members, each having its lower end connected to an end part of the bottom, with said members extending around the edges of the sign carrying member and the flange last mentioned, and means for connecting the adjacent ends of the two channel-shaped members together.

2. A sign of the class described comprising a casing having its front open and its bottom flat, with an upstanding flange at the outer edge of the bottom and a strip extending along the upper face of the bottom and spaced from the flange, an outwardly extending flange at the sides and top of the casing and surrounding the opening, a sign carrying member having its lower edge fitting in the space between the first mentioned flange and the strip and the sides and top edges thereof abutting the second mentioned flange, a pair of channel-shaped members each having an end fastened to an end part of the flat bottom with said members extending upwardly around the edges of the sign carrying member and the second mentioned flange and having upstanding ears at their upper ends, and a bolt passing through said ears, and a lamp in the casing for illuminating the sign carrying member.

3. In combination with a spare tire of an automobile, a casing, a sign carrying member therein, means for illuminating the said member, a substantially hook-shaped part connected to the rear of the casing and passing over the top of the tire, a pair of hook-shaped members connected to the sides of the casing and passing around portions of the tire, and a spring connecting the last mentioned members together.

CARL EDWIN FACKINER.